(12) United States Patent
Vanlier et al.

(10) Patent No.: US 6,400,511 B2
(45) Date of Patent: Jun. 4, 2002

(54) PROJECTION SYSTEM AND METHOD OF CONTROLLING A SQUARE-WAVE CURRENT LIGHT SOURCE IN A PROJECTION SYSTEM

(75) Inventors: Gerardus Johannes Josephus Vanlier; Willem Hendrik Smits, both of Eindhoven (NL); Serge Joel Armand Bierhuizen, Wilsonville, OR (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/745,877

(22) Filed: Dec. 22, 2000

(30) Foreign Application Priority Data

Dec. 24, 1999 (EP) .............................. 99204538
Feb. 29, 2000 (EP) .............................. 00200715

(51) Int. Cl.[7] .................. G02B 27/14; H04N 9/083; H04N 9/12
(52) U.S. Cl. .................. 359/634; 348/270; 348/743
(58) Field of Search .................. 359/634; 315/224; 348/270, 271, 272, 273, 743

(56) References Cited

U.S. PATENT DOCUMENTS 5,046,162 A * 9/1991 Suzuki et al. .............. 348/270
5,608,294 A * 3/1997 Ganser et al. .............. 315/224
5,917,558 A * 6/1999 Stanton .............. 348/743

FOREIGN PATENT DOCUMENTS

WO    WO 96 14724 A  *  5/1996

* cited by examiner

Primary Examiner—Ricky Mack
(74) Attorney, Agent, or Firm—Dicran Halajian

(57) ABSTRACT

A projection system is provided with a square-wave current light source and a color wheel with differently colored segments. The lifetime of the light source is long since the square-wave current constantly changes polarity a constant power is supplied to the light source and, before changing polarity, a current pulse is each time provided, driving the square-wave current to a predetermined strength which is larger than the current strength in between the current pulses. In the course of time, the amount of power in the current pulses increases relative to the amount of power in the current in between the current pulses. By controlling the timing of occurrence of the current pulses to constantly coincide in time and, on average, an equal number of times with all colors of the color wheel, the position of the white color point is independent of the period of time of use of the light source.

6 Claims, 4 Drawing Sheets

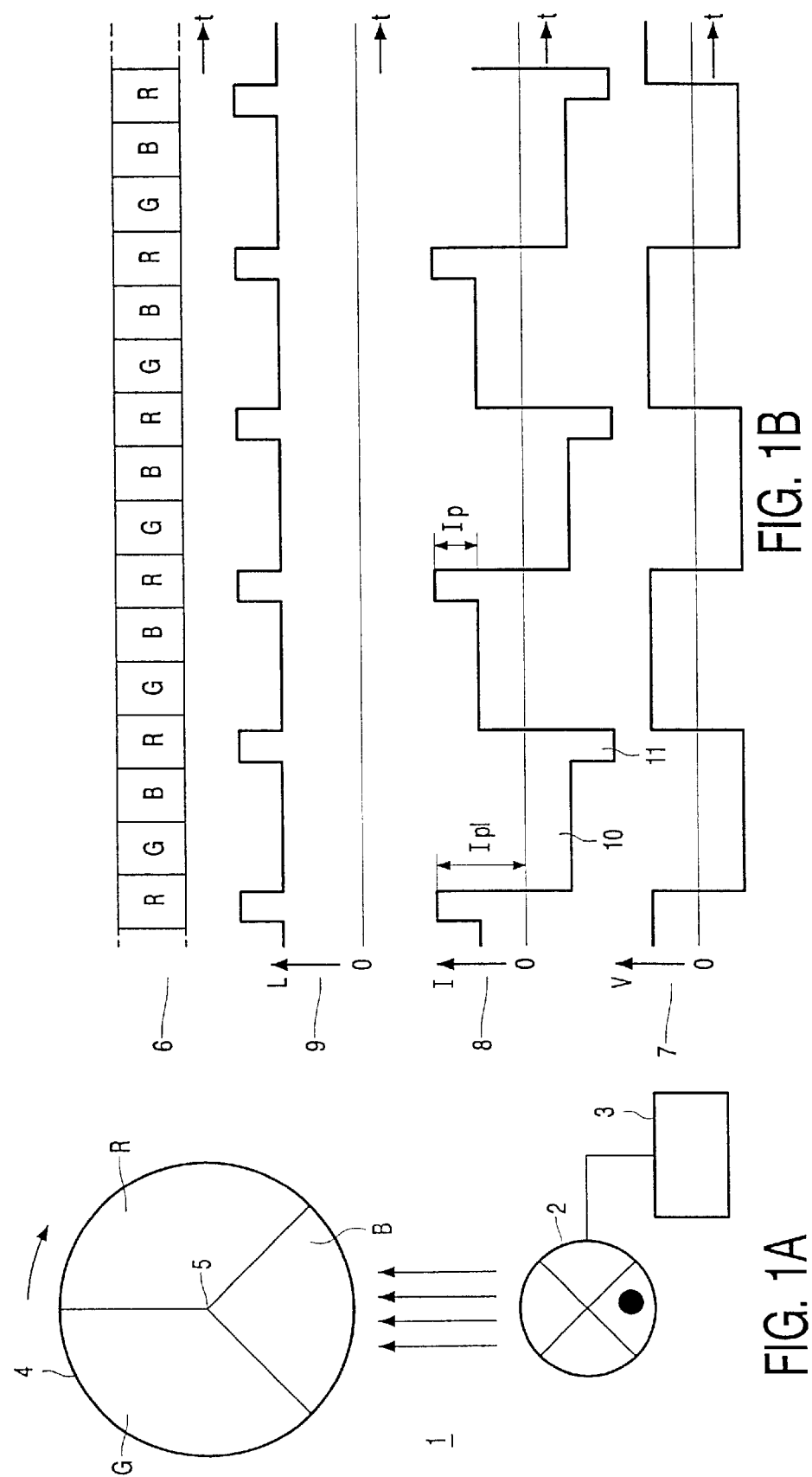

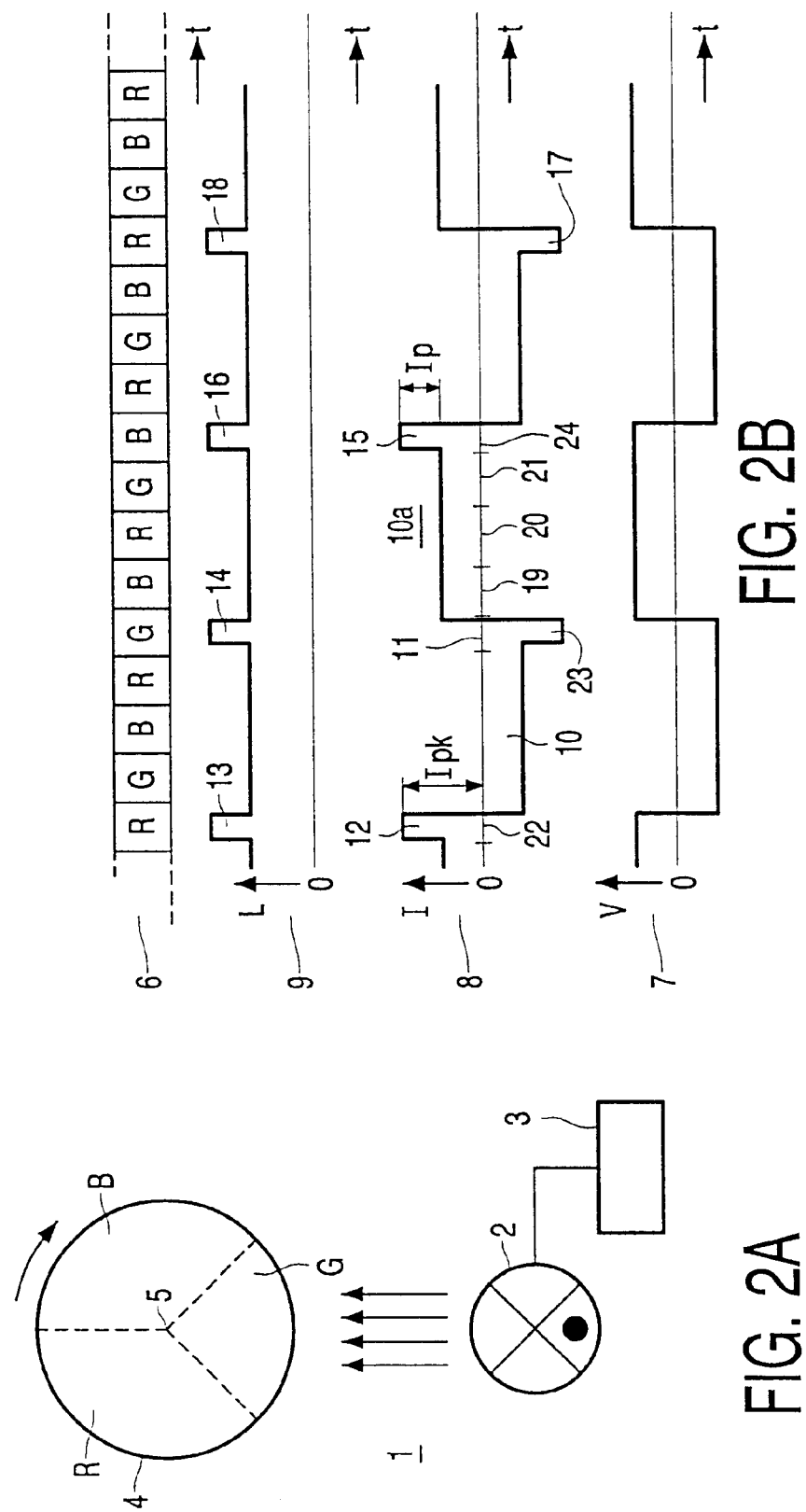

PROJECTION SYSTEM AND METHOD OF CONTROLLING A SQUARE-WAVE CURRENT LIGHT SOURCE IN A PROJECTION SYSTEM

The invention relates to a method of controlling a square-wave current light source in a projection system having a color wheel with differently colored segments, which square-wave current is controlled to constantly change the polarity of the square-wave current, to provide a constant power to the light source from polarity change to polarity change, and to provide each time before changing polarity, a current pulse driving the square-wave current to a predetermined current strength which is layer than the current strength in between the current pulses.

The invention also relates to a projection system comprising a square-wave current light source and a color wheel with differently colored segments comprising means for controlling the square-wave current to constantly change the polarity of the square-wave current, to provide a constant power to the light source and to provide each time before changing polarity, a current pulse driving the square-wave current to a predetermined strength which is larger than the current strength in between the current pulses.

Light outputs from such light sources are proportional to the power dissipated by the light source. Therefore, such light sources are power-controlled to control their light output. The power control ensures that the amount of power dissipated by the light source is constant in time. The voltage across the light source is a lamp-dependent constant. This constant, however, increases when the lamp ages.

A known and already resolved drawback of such a light source is that the stability of the arc is not constant with respect to time. Improvement of the arc stability is important to reduce intensity variations of the image and has already been achieved by superimposing a current pulse on the square-wave current for the light source and synchronizing the current pulse with the color wheel. The known superimposed current has a predefined constant value and is set by the lamp supply.

It is also known that light sources for projection systems generally do not have a spectral distribution which accomplishes a white color point perceived as white by a viewer of an image projected by the projection system.

In the prior art, various solutions have been proposed to arrive at an acceptable white color point using square-wave current light sources. Amongst these solutions are those in which the current strength of the current through the light source is increased during the period in which the color of the color wheel is present, which color is less present in the spectrum of the light source.

It has been proposed before to have the current pulse, which is present to improve the arc stability of the light source, coincide with the segment of the color wheel having the color that is less present in the spectrum of the light source. In this way, both the arc stability of the light source is increased and the white color point of the projection system is shifted to a more acceptable value.

It has now been found that, during usage of the light source, a shift of the white color point takes place. The shift is due to the fact that the voltage across the lamp increases with the usage of the lamp. Consequently, when the lamp has aged, a lower current is sufficient to create the same power level as the power level created when the lamp was still new. Another consequence is that the amount of power dissipated during the superimposed current pulse of constant value increases with the usage of the light source, because the lamp voltage increases and the superimposed current pulse remains at the same current level.

Since, however, the total power supplied to the light source from polarity change to polarity change is constant, an increase of the power during the current pulse is compensated by a decrease of the power in between the current pulses. Since, during usage, the voltage across the light source increases, it is not possible to maintain the current strength in between the current pulses at the level used shortly after putting the light source into use. When the voltage increases, there is only one way to decrease the power in between the current pulses and that is to decrease the current strength in between the pulses. Consequently, the intensity of the color during which the current pulse occurs increases, but the intensity of the other two colors decreases slightly. This is visible in the image as a shift of the white color point with the usage of the lamp.

It is an object of the present invention to provide a method of controlling a square-wave current light source in a projection system in which the above-mentioned disadvantage of a shift of the white color point is avoided.

It is also an object of the present invention to provide a projection system with a square-wave current light source which is not subject to the above-mentioned disadvantage of a shift of the white color point with increasing usage of the light source.

To this end, method according to the invention is characterized by controlling the timing of occurrence of the current pulses to constantly coincide in time and, on average, an equal number of times with all colors of the color wheel.

A projection system according to the invention is characterized by control means being adapted to control the timing of occurrence of the current pulses to constantly coincide in time and, on average, an equal number of times with all colors of the color wheel.

It is thereby achieved that the current pulse successively occurs in e.g. a red segment, a green segment and a blue segment. Together, these three pulses lead to white, irrespective of the usage of the light source.

A preferred embodiment of a projection system according to the invention is characterized by a color wheel comprising red, green and blue color segments separate from other red, green and blue segments, respectively, and having widths, which are matched to the durations of the current pulses.

It is thereby achieved that the color wheel comprises a set of segments which is specifically dedicated to the use of the current pulses in a projection system according to the invention.

A further preferred embodiment of a projection system according to the invention is characterized in that the timing control means are adapted to provide equal time periods between successive current pulses, and in that the pulse width-matched color segments are distributed evenly along a circumferential direction of the color wheel.

A still further preferred embodiment of a projection system according to the invention is characterized in that the timing control means are adapted to provide different time periods between successive current pulses, and in that the pulse width-matched color segments are distributed unevenly along a circumferential direction of the color wheel.

It is thereby achieved that, besides the segments whose widths are matched to the durations of the current pulses, the remainder of the color wheel may be divided in a to red, a green and a blue segment, which segments relative to each other do not have the same dimensions in the circumferential direction. As is known from the prior art, a color white point may thereby be achieved that takes an uneven spectral distribution of the light source into consideration.

The invention will now be described with reference to the accompanying drawings in which:

FIGS. 1A and 1B show a light source and a color wheel and their operation according to the prior art;

FIGS. 2A and 2B show a light source and a color wheel and their operation according to the invention;

Figures 3A, 3B:
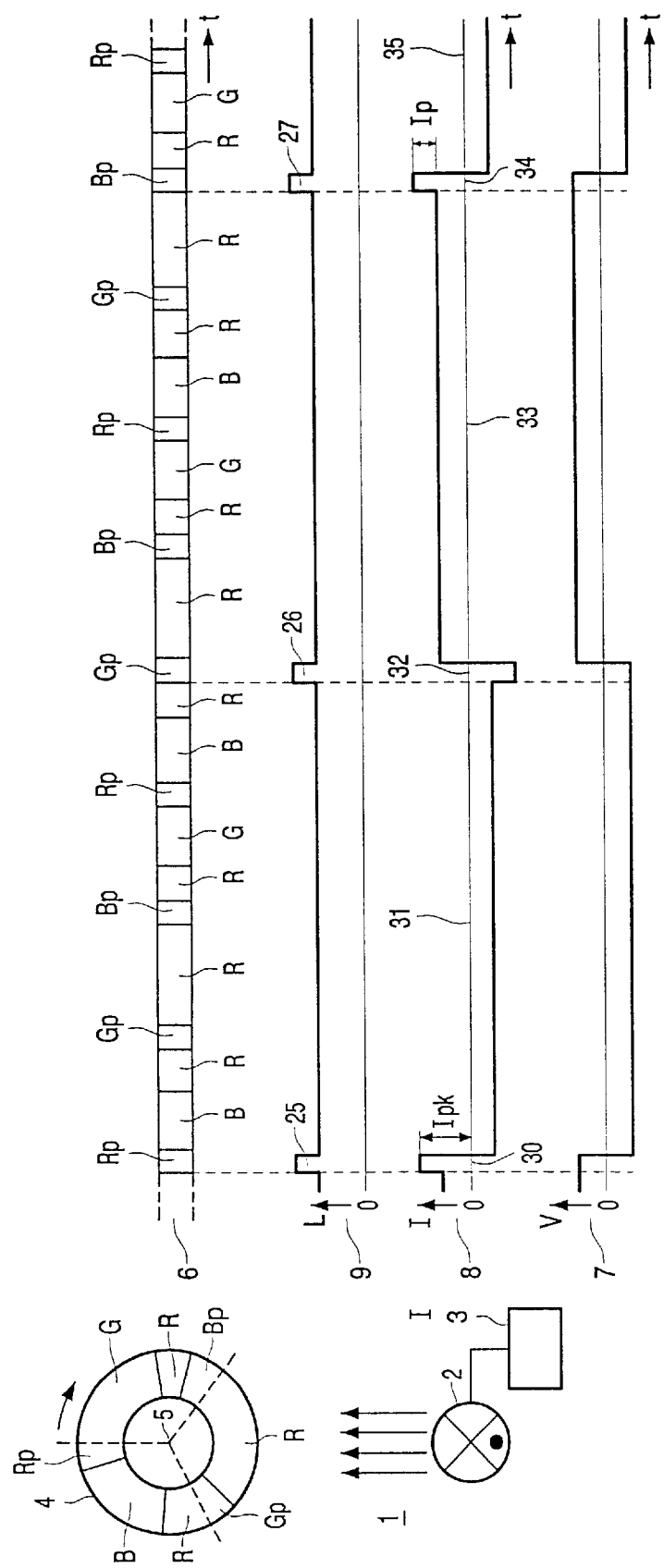
FIGS. 3A and 3B show a light source and a color wheel and their operation according to a second embodiment of the invention.

Referring to FIG. 1A, a relevant part of a projection system 1 is shown. It comprises a light source 2, a control unit 3 and a color wheel 4. The color wheel 4 is divided into three segments, a red segment R, a green segment G and a blue segment B. The color wheel 4 is rotatable about its center 5. A projection system 1 with a light source 2, a control unit 3 and a rotatable color wheel 4 are known as such in the art and will not be further described in detail, unless necessary for the description and understanding of the present invention. Diagram 6 shows, as a function of time, which color segment is illuminated at any point of time by the light source 2. Diagrams 7, 8 and 9 show the voltage V across the lamp 2, the current I through the lamp 2 and the amount of light L outputted by the lamp 2, respectively, all as a function of time and with respect to voltage V and current I under the control of control unit 3. Generally, the segments R, G and B of the color wheel 4 have the same circumferential dimensions, i.e. when the color wheel 4 is rotated at a constant rotational speed about center 5, each segment R, G and B is illuminated by the lamp 2 for the same period of time. This is shown in diagram 6. Diagrams 7 and 8 together show that the current I through the lamp 2 is not controlled by the voltage V across the lamp 2. As is known in the art, it is advantageous for the current through and the voltage across the lamp 2 to constantly change polarity, as is shown in diagrams 7 and 8. It is also known that, in order to improve the arc stability of the light source 2 just before any change in polarity the current through the lamp 2 should be increased to a peak value Ipk.

The amount of light outputted by the light source 2 is proportional to the power dissipated in the light source 2 as shown in diagram 9. Usually, the spectral distribution of the light emitted by light source 2 does not have an even spectral distribution among all the colors of the spectrum. Usually, one of the colors red, green and blue is present in smaller amounts than the other two colors. In the present description, we shall assume, for ease of reference only, that the spectrum of the light source 2 is somewhat deficient in red relative to blue and green. As a consequence, the white color point of a projection system with such a light source 2 is off-balance. The white color point position and thus the color rendition of an image projected by the projection system 1 can be improved by increasing the amount of red and keeping the amounts of green and blue in the projection system 1.

By setting control unit 3 correctly, as is known as such in the art, the current pulses Ip are synchronized with the rotation of the color wheel 4 whenever the red segment is illuminated by the light source 2. Though all parts of the spectrum will have increased in intensity during the occurrence of the current pulse Ip, only the red part is relevant when the red segment is in front of the light source 2, while blue and green light, though increased in intensity, will not be transmitted by the red segment of the color wheel 4. At the instant when the green segment is rotated in front of the light source 2 after the red segment, the current pulse Ip will already have ended. The position of the white color point is then more acceptable than the position of the white color point related to a situation in which there is no current pulse Ip.

The projection system described herein before and referring to FIGS. 1A and 1B has a disadvantage that becomes clear as time passes and usage increases since the point of time when the system with the light source 2 was put into use. Since the voltage across the light source 2 increases due to usage of the light source 2, as shown in diagram 7, it is necessary for the current I shown in diagram 8 to be lowered while Ipk remains constant. For example, a light source 2 with a voltage of about 80 Vrms may need a current Ipk of 2.2A to stabilize the arc at the point of time when the light source 2 was put into use. However, after, for example, 4000 hours of use, the voltage V has increased to 100 Vrms while the current Ipk remains 2.2A during the current pulse Ip. Consequently, the power dissipation in the light source 2 during the current pulse increases from about 176W at a point of time when the light source 2 was put into use to about 220W after about 4000 hours of use.

Light source 2 is controlled by control unit 3 in such a way that the power dissipated in the light source 2 and averaged over longer periods of time is constant. The smallest period of time that is relevant for averaging is the period of time from one current pulse up to and including the next current pulse. The period of time from one current pulse to a subsequent current pulse can be divided into two parts: a first part 10 and a current pulse part 11. Since, during usage, the amount of power dissipated during the part 11 increases and since the total power during the periods 10 and 11 together is constant, it appears that the power dissipated in the light source 2 during the period 10 decreases with increasing usage of the light source 2. Since the voltage V increases with usage, the current through the light source 2 during the period 10 has to decrease with increasing usage of the light source 2. Since the intensity of the light emitted by the light source 2 is proportional to the power dissipated by the light source 2, it will be clear that during the period 10, when the segments G and B are in front of the light source 2 the amount of light emitted in the green and blue parts of the spectrum by the light source 2 is slightly smaller than the amount of light in the green and blue parts of the spectrum at the point of time when the light source 2 was put into use. Where the amount of red light transmitted by the red segment R of the color wheel 4 increases over time, the amount of green light and blue light transmitted by the segments G and B, respectively, of the color wheel 4 decreases over time. As a consequence, a shift of the white color point of the system occurs with increasing usage of the system.

FIGS. 2A and 2B show a solution to the problem described hereinbefore. Like parts are indicated by the same reference numerals and letters as in FIGS. 1A and 1B. Control unit 3 is set for an increase of the time period 10 equal to the time period needed for one third of a rotation of the color wheel 4. As a consequence, a first current pulse 12 leading to a light pulse 13 occurs when the red segment is in front of the light source 2. A second current pulse 23 resulting in a light pulse 14 occurs when the green segment G is in front of the light source 2, and a third current pulse 15 resulting in an increased light output 16 occurs when the blue segment B of the color wheel 4 is in front of the light source 2. A fourth current pulse 17 resulting in a light pulse 18 again occurs when the red segment R is in front of the light source 2.

For better understanding, a time period 10a equivalent to time period 10 is divided into time periods 19, 20 and 21 corresponding to the periods of time when the blue segment B, the red segment R and the green segment G are in front of and illuminated by the light source 2. Since the current I through the light source 2 is the same during the periods of time 19, 20 and 21, a complete color image composed of a blue, a red and a green partial image is formed. The only thing which is not completely correct with this image is the white color point, since the spectrum of the light emitted by the light source 2 is deficient in red light relative to blue and green light.

The time periods 11, 22 and 24 correspond to the periods of time in which the current pulses 12, 23 and 15 occur. As has been described above, time period 22 corresponds to a period of time in which the red segment R of the color wheel 4 is in front of and illuminated by the light source 2. The same holds for time period 11 and the green segment G and the time period 24 and the blue segment B. So, all together, during the time periods 22, 23 and 24 a red partial image, a green partial image and a blue partial image are projected by the projection system 1, though with a higher intensity than the image projected during the time periods 19, 20 and 21.

It will be clear that no correction has been made for the deficiency of red light relative to green and blue light in the light emitted by the light source 2. However, irrespective of the value of the current I during the periods of time 19, 20 and 21, i.e. during any period 10, 10a etc. the white color point is constant during these periods. Exactly the same holds for the white color point during the periods 11, 22 and 24 etc. Also this white color point is constant with respect to time because the peak current Ipk is constant with respect to time. Moreover, since the spectrum of the light source 2, is independent of the value of the current I through the light source 2 the white color point achieved during the periods 10, 10a etc. is exactly the same as the white color point achieved during the periods 22, 23 and 24 etc. In other words, the shift in the white color point that was present in an embodiment of a projection system according to FIGS. 1A and 1B is not present anymore in a projection system according to FIGS. 2A and 2B has been eliminated.

It is to be noted that the current pulses 12, 15, 17, 23 etc. occur evenly distributed among red, green and blue segments of the color wheel 4. Evenly distributed is understood to mean that, over a certain period of time, the number of times when the current pulse coincides with a red segment is equal to the number of times when the current pulse coincides with the green segment and is equal to the number of times when the current pulse coincides with the blue segment.

FIG. 3A shows an embodiment of the invention that allows both a desired setting of the white color point and elimination of the shift in the white color point (sometimes also called a drift in color balance) with increasing usage of the light source 2. The color wheel 4 is segmented into eight colored segments. As before, the letters R, G and B indicate a red segment, a green segment and a blue segment, respectively. Furthermore, the indications Rp, Gp and Bp indicate a red segment, a green segment and a blue segment, respectively, which are used for eliminating a drift in color balance. The segments Rp, Gp and Bp are distributed with 120° distance between them along a circumferential direction of the color wheel 4. In this situation, the control unit 3 has to generate control signals only at predetermined and fixed points of time so as to initiate the current pulse through the light source 2. The color wheel 4 shown in FIG. 3A has been designed for a light source 2 that is deficient in the amount of red light in its spectrum relative to the amounts of green and blue light. Therefore, going along the circumference of color wheel 4, the total length of red segments is larger than the total lengths of the green and blue segments. The lengths of the red, green and blue segments can of course be adjusted to a specific spectral distribution of the colors in the light emitted by the light source 2. Nevertheless, care should be taken that in this embodiment the red, green and blue segments Rp, Gp and Bp of predetermined length and at predetermined, 120° different, circumferential positions are present.

Control unit 3 controls the timing of the voltage V across and the current I through the light source 2 as shown in diagrams 7 and 8 of FIG. 3B, resulting in a light output L as shown as a function of time in diagram 9. Diagrams 6 and 9 show that light pulse 25 coincides with red segment Rp, light pulse 26 coincides with green segment Gp and light pulse 27 coincides with blue segment Bp. As is shown in diagram 8, the current pulses Ip occur during the time periods 30, 32 and 34, whereas the current is at its normal level during the time periods 31, 33 and 35 etc. During time periods 31, 33 and 35, the light output L of light source 2 is at a constant level. In order that the projection system projects an image with a desired white color point, the red, green and blue segments of the color wheel 4, i.e. including the segments Rp, Gp and Bp, should have such a total length that the matched distribution of the spectral distribution of the light emitted by the light source 2 is compensated by longer and shorter periods of time that when relevant color is transmitted by the color wheel 4. On the other hand, the presence of the relatively small segments Rp, Gp and Bp together with a correct timing by the control unit 3 in such a way that the current pulses Ip exactly coincide in time with the segments Rp, Gp and Bp ensures, as described hereinbefore with reference to FIGS. 2A and 2B, that no shift of the white color point takes place with increasing usage of the light source 2.

Figure 4A:
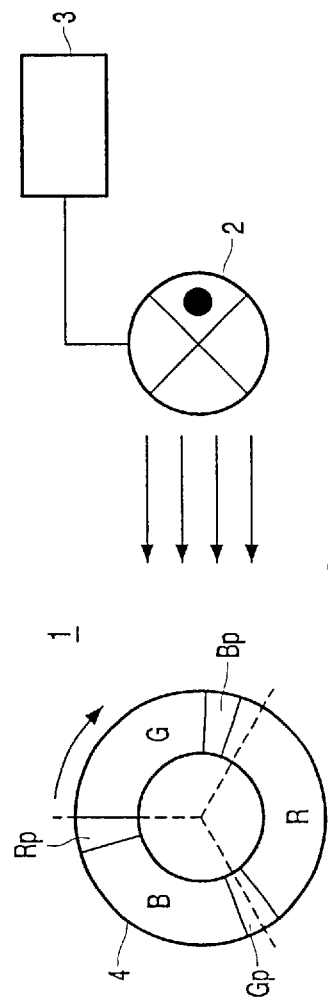
FIGS. 4A and 4B show a light source and a color wheel and their operation according to a third embodiment of the invention.
Figure 4B:
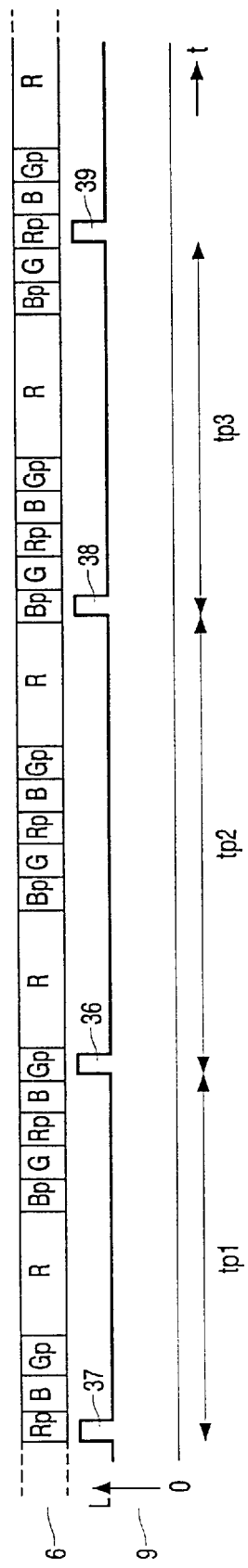

FIGS. 4A and 4B show a further embodiment of the present invention in which again, as in FIG. 3A, a red colored segment Rp, a green colored segment Gp and a blue colored segment Bp are present which are used to prevent a shift of the white color point. It is now to be noted that the segments Rp, Gp and Bp are not distributed evenly with 120° difference along the circumference of the color wheel 4. The remainder of the color wheel 4 is segmented into one red segment R, one green segment G and one blue segment B. As mentioned hereinbefore in relation to FIG. 3A, the circumferencial lengths of the red segment R together with the red segment Rp, the green segment G together with the green segment Gp and the blue segment B together with the blue segment Bp are such that a desired color white point is achieved in the image projected by the projection system when the color wheel is rotated about the center 5 and illuminated by the light source 2 with a constant light output.

Also in this case the control unit 3 is adapted to generate current pulses Ip (see FIGS. 1, 2 and 3) to occur at points of time when one of the three segments Rp, Gp and Bp is illuminated by the light source 2. In ways known as such and therefore not further described, the timing of the occurrence of the current pulses by the control unit 3 is synchronized with the rotational positions of the color wheel 4 for the current pulses to occur only when one of the three segments Rp, Gp or Bp is illuminated by the light source 2.

Furthermore, control unit 3 is adapted to generate a current pulse Ip resulting in a light pulse 36 coinciding in time with the green segment Gp only the second time when the segment Gp is illuminated by the light source 2 after a light pulse 37 has been emitted by the light source 2 under the control of the control unit 3 and coinciding with the red segment Rp. The same holds for the generation of the light pulse 38 coinciding in time with the presence of the blue segment Bp. Light pulse 38 is generated only the second time when segment Bp is illuminated by the light source 2 after light pulse 36 has been generated. The same holds again for the next time when red segment Rp coincides with a light pulse 39. It is to be noted that the periods of time tp1, tp2 and tp3 between the light pulses are now not equal anymore like they were in the embodiments described with reference to FIGS. 2A and 3A. However, since the positions along a circumference of the color wheel 4 of the segments Rp, Gp and Bp may be chosen arbitrarily in the embodiment of FIG. 4A, it is not necessary to split up the red, the green and the blue segments R, G and B, respectively, as in the embodiment shown in FIG. 3A.

What is claimed is:

1. A method of controlling a square-wave current light source (2) in a projection system (1) having a color wheel (4) with differently colored segments (R, G, B), which square-wave current (I) is controlled to constantly change the polarity of the square-wave current (I), to provide a constant power to the light source (2) from polarity change to polarity change, and to provide each time before changing polarity, a current pulse (Ip, 12, 15, 17, 23) driving the square-wave current (I) to a predetermined current strength (Ipk) which is larger than the current strength in between the current pulses (Ip, 12, 15, 17, 23), characterized by controlling the timing of occurrence (22, 24, 30, 32, 34) of the current pulses (Ip, 12, 15, 17, 23) to constantly coincide in time and, on average, an equal number of times with all colors (R, G, B, Rp, Gp, Bp) of the color wheel.

2. A method as claimed in claim 1, characterized by at least one complete color sequence of the color wheel between successive current pulses.

3. A projection system (1) comprising a square-wave current light source (2) and a color wheel (4) with differently colored segments (R, G, B) comprising means (3) for controlling the square-wave current (I) to constantly change the polarity of the square-wave current (I) to provide a constant power to the light source (2) and to provide, each time before changing polarity, a current pulse (Ip, 12, 15, 17, 23) driving the square-wave current (I) to a predetermined strength (Ipk) which is larger than the current strength in between the current pulses (Ip, 12, 15, 17, 23), characterized by the control means (3) being adapted to control the timing of occurrence (22, 24, 30, 32, 34) of the current pulses (Ip, 12, 15, 17, 23) to constantly coincide in time and, on average, an equal number of times with all colors (R, G, B, Rp, Gp, Bp) of the color wheel.

4. A projection system as claimed in claim 3, characterized by a color wheel comprising red (Rp), green (Gp) and blue (Bp) color segments separate from other red (R), green (G) and blue (B) segments, respectively, and having widths which are matched to the durations of the current pulses (Ip, 12, 15, 17, 23).

5. A projection system as claimed in claim 4, characterized in that the timing control means (3) are adapted to provide equal time periods between successive current pulses (Ip, 12, 15, 17, 23), and in that the pulse width-matched color segments (Rp, Gp, Bp) are distributed evenly along a circumferential direction of the color wheel (4).

6. A projection system as claimed in to claim 4, characterized in that the timing control means (3) are adapted to provide different time periods (tp1, tp2, tp3) between successive current pulses (Ip, 12, 15, 17, 23), and in that the pulse width-matched color segments (Rp, Gp, Bp) are distributed unevenly along a circumferential direction of the color wheel.

* * * * *